(12) United States Patent
Bull

(10) Patent No.: US 11,361,320 B2
(45) Date of Patent: Jun. 14, 2022

(54) FRAUD DETECTION AND CONTROL IN MULTI-TIERED CENTRALIZED PROCESSING

(71) Applicant: Alegeus Technologies, LLC, Waltham, MA (US)

(72) Inventor: John Bull, Nashua, NH (US)

(73) Assignee: Alegeus Technologies, LLC, Waltham, MA (US)

(*) Notice: Subject to any disclaimer, the term of this patent is extended or adjusted under 35 U.S.C. 154(b) by 0 days.

(21) Appl. No.: 17/063,090

(22) Filed: Oct. 5, 2020

(65) Prior Publication Data

US 2021/0035108 A1 Feb. 4, 2021

Related U.S. Application Data

(63) Continuation of application No. 16/175,237, filed on Oct. 30, 2018, now Pat. No. 10,796,312.

(60) Provisional application No. 62/692,157, filed on Jun. 29, 2018.

(51) Int. Cl.
*G06Q 20/40* (2012.01)
*G08B 13/22* (2006.01)
*G06N 20/00* (2019.01)

(52) U.S. Cl.
CPC ......... *G06Q 20/4016* (2013.01); *G06N 20/00* (2019.01); *G08B 13/22* (2013.01)

(58) Field of Classification Search
CPC ............................ G06Q 20/4016; G08B 13/22
See application file for complete search history.

(56) References Cited

U.S. PATENT DOCUMENTS

| | | | |
|---|---|---|---|
| 9,202,249 B1* | 12/2015 | Cohen | H04L 63/145 |
| 2014/0108251 A1* | 4/2014 | Anderson | G06Q 20/4016 705/44 |
| 2015/0142595 A1* | 5/2015 | Acuna-Rohter | G06Q 30/06 705/21 |
| 2016/0217470 A1* | 7/2016 | Gerard | G06Q 20/4016 |

OTHER PUBLICATIONS

Non-Final Office Action on U.S. Appl. No. 16/175,237, dated Feb. 19, 2020.
Notice of Allowance on U.S. Appl. No. 16/175,237, dated Jun. 24, 2020.

* cited by examiner

*Primary Examiner* — Scott C Anderson
(74) *Attorney, Agent, or Firm* — Foley & Lardner LLP

(57) ABSTRACT

Detecting and controlling fraud in centralized processing is provided. A system receives data packets carrying electronic transactions, and clusters the electronic transactions based on an intermediary identifier of each of the electronic transactions to identify a first cluster and a second cluster. The system generates a first model for the first cluster and a second model for the second cluster. The system detects a fraudulent electronic transaction having a first source identifier. The system locks a first data structure to prevent transfer of a first resource in electronic transactions associated with the first source identifier. The system identifies source identifiers associated with the first cluster in a first tier. The system locks absent detection of the fraudulent electronic transaction in one or more electronic transaction associated with the source identifiers, the data structure corresponding to each of the source identifiers in the first cluster.

20 Claims, 6 Drawing Sheets

FRAUD DETECTION AND CONTROL IN MULTI-TIERED CENTRALIZED PROCESSING

CROSS-REFERENCES TO RELATED APPLICATIONS

This application claims the benefit of priority under 35 U.S.C. § 120 as a continuation of U.S. patent application Ser. No. 16/175,237, filed Oct. 30, 2018, which claims the benefit of priority under 35 U.S.C. § 119 to U.S. Provisional Patent Application No. 62/692,157, filed Jun. 29, 2018, each of which is hereby incorporated by reference herein in its entirety.

FIELD OF THE DISCLOSURE

The present solution is generally directed to detecting or controlling fraud in multi-tiered centralized processing. In particular, the present solution can identify fraudulent activity in a tier of a multi-tiered processing infrastructure, and automatically perform action to mitigate or prevent further fraudulent activity in the tier or other tiers in the multi-tiered processing infrastructure.

BACKGROUND OF THE DISCLOSURE

Entities can provide various types of electronic tax benefit accounts. These accounts can be susceptible to network attacks, threats, spoofing, or fraud. As the number and types of electronic tax benefit accounts increase, it may be challenging to efficiently identify and stop the fraud.

BRIEF SUMMARY OF THE DISCLOSURE

The systems and methods of the present solution are directed to the technical problems and challenges of detecting and controlling network attacks, threats, spoofing, or fraud on an electronic account. The systems and methods of the present solution are directed to the improvement of the performance and operation of the electronic transaction based technology and platform and computing and networking resource used by such electronic transaction based technology and platform. In some aspects, the present solution improves and enhances the implemented functionality of the electronic transaction based technology and platform implemented on, integrated with and inherently tied to the processor, memory, network and computing resources of one or more computing devices. In some aspects, the present solution more effectively performs the functionality of the electronic transaction based technology and platform thereby making and causing more effective use of the computing and networking resources to achieve the improved functionality of the present solution. The same computing and network resources used by such electronic transaction based technology and platform will provide increased and improved functionality with implementation of the present solution.

In some aspects, systems and methods of the present solution are directed to fraud detection and controlled in centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure. However, it may be challenging to reliably and efficiently detect and control fraudulent activity or transactions when the devices used to conduct or initiate the transactions are grouped in different tiers because the fraudulent activity may go undetected or unnoticed as it can be masked within a tier. Thus, systems and methods of the present technical solution are directed to detecting and control fraud in centralized state processing.

For example, the present solution can provide a centralized state processing system configured with a clusterer, model generator, fraud detector, and packet blocker. This system can detect fraud based on comparing debit card spending activity with historical spending activity at various segmentation levels (e.g., third-party administrator levels, employer levels). For example, the total spend for an employer having 1000 individual employees may be more stable. This technology is directed to protecting the employer, as opposed to just the individual employee. The technology can stop all transactions for an employer responsive to detecting fraud. Further, the technology can disable all fraudulent cards, as well as non-fraudulent cards, associated with the same group level. Thus, by establishing models and monitoring on various segmentation levels, as opposed to just the individual transaction, the system can detect and control fraud at any segmentation level (e.g., based on group activity), thereby intercepting fraud on the group level that may otherwise go undetected at the individual transaction level.

At least one aspect of the present disclosure is directed to a method of fraud detection and control in centralized processing. The method can be performed by a centralized state processing system having one or more processors and memory. The method can include the centralized state processing system receiving data packets carrying electronic transactions. Each of the electronic transactions can include a source identifier corresponding to a data structure storing a resource, a destination identifier corresponding to a data structure to transfer the resource, and an intermediary identifier corresponding to an entity that provides at least a portion of the resource stored in the data structure. The method can include the centralized state processing system clustering the source identifier of each of the electronic transactions based on the intermediary identifier of each of the electronic transactions to identify a first cluster of source identifiers in a first tier having a first intermediary identifier, and a second cluster of source identifiers in a second tier having a second intermediary identifier. The method can include the centralized state processing system generating a first model for the first cluster of source identifiers and a second model for the second cluster of source identifiers. The method can include the centralized state processing system detecting, using the first model, a first source identifier and the first intermediary identifier. The first source identifier can correspond to a first data structure storing a first resource. The method can include the centralized state processing system locking, responsive to detection of the fraudulent electronic transaction, the first data structure to prevent transfer of the first resource in electronic transactions associated with the first source identifier. The method can include the centralized state processing system identifying source identifiers associated with the first cluster of source identifiers in the first tier. The method can include the centralized state processing system locking, in the absence of detection of the fraudulent electronic transaction in one or more electronic transaction associated with the plurality of source identifiers, the data structure corresponding to each of the plurality of source identifiers in the first cluster of source identifiers.

In some embodiments, the method includes generating, based on a machine learning model, the first model based on first historical electronic transactions associated the first tier that occurred during a first predetermined time interval absent the fraudulent electronic transaction. The method can include generating, based on the machine learning model, the second model based on second historical electronic transactions associated with the second tier that occurred during a second predetermined time interval absent the fraudulent electronic transaction. The second predetermined time interval is different from the first predetermined time interval, and the fraudulent electronic transaction is absent from the second predetermined time interval.

In some embodiments, the method includes selecting the first predetermined time interval absent the fraudulent electronic transaction to generate the first model based on a first characteristic of the first tier. The method can include selecting the second predetermined time interval to generate the second model based on a second characteristic of the second tier.

In some embodiments, the method can include generating an electronic transaction model for the first source identifier. The method can include using the electronic transaction model to detect the fraudulent electronic transaction having the first source identifier and the first intermediary identifier, the first intermediary identifier.

In some embodiments, the method can include receiving a second plurality of electronic transactions associated with the first tier. The method can include authorizing each of the second plurality of electronic transactions based on not detecting fraud on each of the second plurality of electronic transactions. The method can include applying a statistical analysis to an aggregate of the second plurality of electronic transactions. The method can include detecting fraud in the first tier based on the statistical analysis applied to the aggregate of the second plurality of transactions. The fraud may not be detected on each of the second plurality of electronic transactions when analyzed independently. The method can include locking source identifiers associated with the second plurality of electronic transactions.

In some embodiments, the method can include generating an alert based on a type of fraud detected by the centralized state processing system. The method can include transmitting the alert to a device associated with the first intermediary identifier. In some embodiments, the intermediary identifier of each of the electronic transactions corresponds to an entity that configures or authorized the source identifier associated with each of the electronic transactions.

In some embodiments, locking the plurality of source identifiers associated with the first tier that are not detected to be fraudulent can include blocking packets carrying electronic transactions associated with one or more of the plurality of source identifiers. In some embodiments, locking the plurality of source identifiers associated with the first tier that are not detected to be fraudulent can include preventing completion of electronic transactions associated with one or more of the plurality of source identifiers.

In some embodiments, the method can include requesting, subsequent to locking the plurality of source identifiers associated with the first tier, multi-factor authentication responsive to a request to conduct an electronic transaction associated with one or more of the plurality of source identifiers that are locked.

At least one aspect is directed to a system to detect and control fraud in centralized processing. The system can include a centralized state processing system having one or more processors and memory that execute a fraud detector. The centralized state processing system (or fraud detector) can receive data packets carrying electronic transactions. Each of the electronic transactions can include a source identifier corresponding to a data structure storing a resource, a destination identifier corresponding to a data structure to transfer the resource, and an intermediary identifier corresponding to an entity that provides at least a portion of the resource stored in the data structure. The fraud detector can cluster the source identifier of each of the electronic transactions based on the intermediary identifier of each of the electronic transactions to identify a first cluster of source identifiers in a first tier having a first intermediary identifier, and a second cluster of source identifiers in a second tier having a second intermediary identifier. The fraud detector can generate a first model for the first cluster of source identifiers and a second model for the second cluster of source identifiers. The fraud detector can detect, using the first model, a fraudulent electronic transaction having a first source identifier and the first intermediary identifier. The first source identifier can correspond to a first data structure storing a first resource. The fraud detector can lock, responsive to detection of the fraudulent electronic transaction, the first data structure to prevent transfer of the first resource in electronic transactions associated with the first source identifier. The fraud detector can identify a plurality of source identifiers associated with the first cluster of source identifiers in the first tier. The fraud detector can lock, absent detection of the fraudulent electronic transaction in one or more electronic transaction associated with the plurality of source identifiers, the data structure corresponding to each of the plurality of source identifiers in the first cluster of source identifiers.

In some embodiments, the centralized state processing system can generate, based on a machine learning technique, the first model based on first historical electronic transactions associated the first tier that occurred during a first predetermined time interval absent the fraudulent electronic transaction. The centralized state processing system can generate, based on the machine learning technique, the second model based on second historical electronic transactions associated the second tier that occurred during a second predetermined time interval absent the fraudulent electronic transaction. The second predetermined time interval may be absent the fraudulent electronic transaction and different from the first predetermined time interval.

The centralized state processing system can select the first predetermined time interval that is absent the fraudulent electronic transaction to generate the first model based on a first characteristic of the first tier. The centralized state processing system can select the second predetermined time interval to generate the second model based on a second characteristic of the second tier.

The centralized state processing system can generate an electronic transaction model for the first source identifier. The centralized state processing system can use the electronic transaction model to detect the fraudulent electronic transaction having the first source identifier and the first intermediary identifier.

The centralized state processing system can receive a second plurality of electronic transactions associated with the first tier. The centralized state processing system can authorize each of the second plurality of electronic transactions based on not detecting fraud on each of the second plurality of electronic transactions. The centralized state processing system can apply a statistical analysis to an aggregate of the second plurality of electronic transactions. The centralized state processing system can detect fraud in the first tier based on the statistical analysis applied to the aggregate of the second plurality of transactions. The fraud may not detected on each of the second plurality of electronic transactions when analyzed independently. The centralized state processing system can lock source identifiers associated with the second plurality of electronic transactions.

The centralized state processing system can generate an alert based on a type of fraud detected by the centralized state processing system. The centralized state processing system can transmit the alert to a device associated with the first intermediary identifier. In some cases, the intermediary identifier of each of the plurality of electronic transactions can correspond to an entity that configures or authorized the source identifier associated with each of the plurality of electronic transactions.

The centralized state processing system can block packets carrying electronic transactions associated with one or more of the plurality of source identifiers. The centralized state processing system can prevent completion of electronic transactions associated with one or more of the plurality of source identifiers. Subsequent to locking the plurality of source identifiers associated with the first tier, the centralized state processing system can request multi-factor authentication responsive to a request to conduct an electronic transaction associated with one or more of the plurality of source identifiers that are locked.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
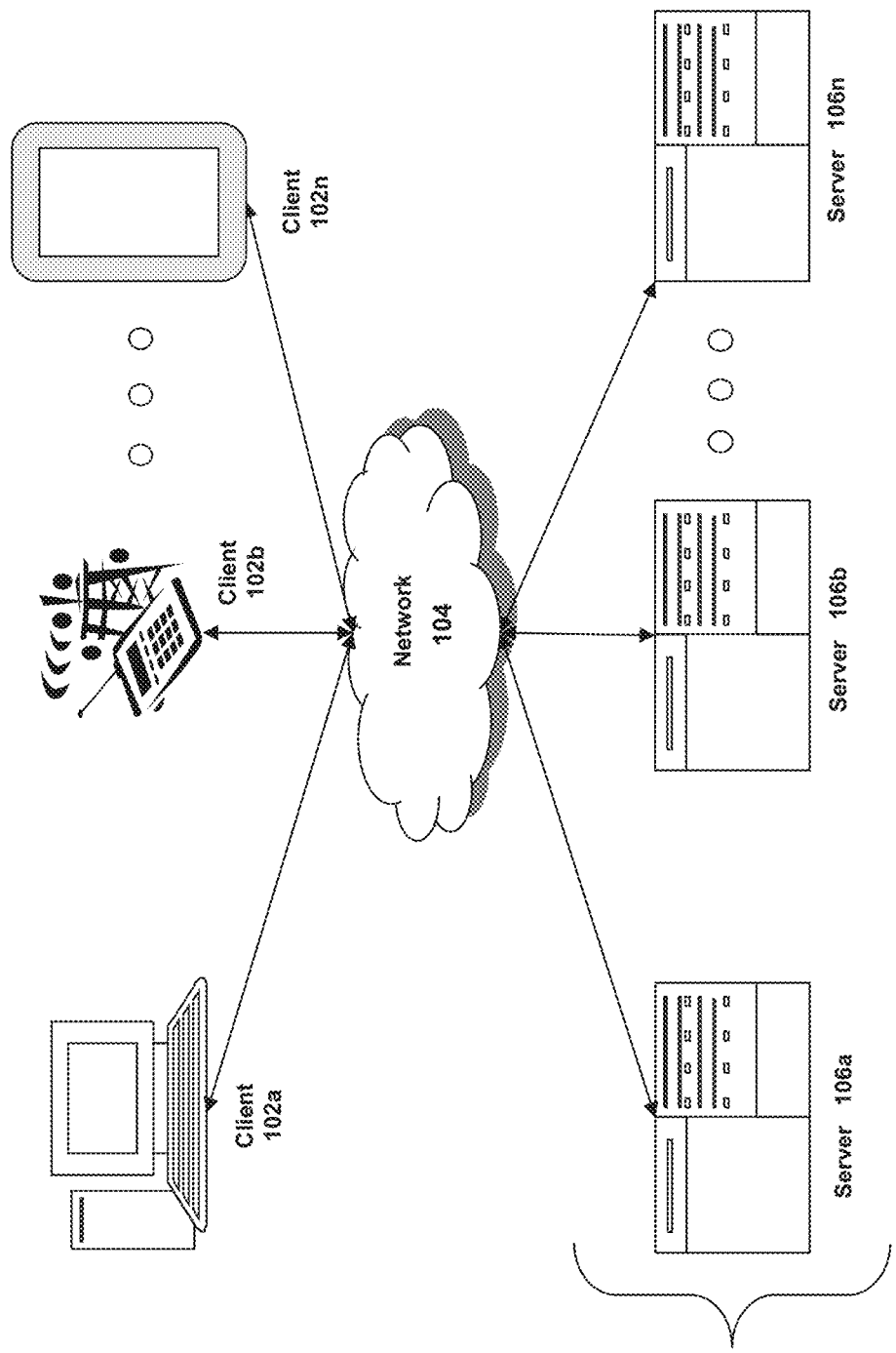
FIG. 1A is a block diagram depicting an embodiment of a network environment comprising client device in communication with server device.

The features and advantages of the present invention will become more apparent from the detailed description set forth below when taken in conjunction with the drawings, in which like reference characters identify corresponding elements throughout. In the drawings, like reference numbers generally indicate identical, functionally similar, or structurally similar elements.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein.

Section B describes embodiments of systems and methods for fraud detection and control in centralized processing.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 can be on the same network 104. In some embodiments, there are multiple networks 104 between the clients 102 and the servers 106. In one of these embodiments, a network 104' (not shown) can be a private network and a network 104 can be a public network. In another of these embodiments, a network 104 can be a private network and a network 104' a public network. In still another of these embodiments, networks 104 and 104' can both be private networks.

The network 104 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, or 4G. The network standards can qualify as one or more generation of mobile telecommunication standards by fulfilling a specification or standards such as the specifications maintained by International Telecommunication Union. The 3G standards, for example, can correspond to the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 104 can be any type and/or form of network. The geographical scope of the network 104 can vary widely and the network 104 can be a body area network (BAN), a personal area network (PAN), a local-area network (LAN), e.g. Intranet, a metropolitan area network (MAN), a wide area network (WAN), or the Internet. The topology of the network 104 can be of any form and can include, e.g., any of the following: point-to-point, bus, star, ring, mesh, or tree. The network 104 can be an overlay network which is virtual and sits on top of one or more layers of other networks 104'. The network 104 can be of any such network topology as known to those ordinarily skilled in the art capable of supporting the operations described herein. The network 104 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 104 can be a type of a broadcast network, a telecommunications network, a data communication network, or a computer network.

In some embodiments, the system can include multiple, logically-grouped servers 106. In one of these embodiments, the logical group of servers can be referred to as a server farm 38 or a machine farm 38. In another of these embodiments, the servers 106 can be geographically dispersed. In other embodiments, a machine farm 38 can be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 can be stored in high-density rack systems, along with associated storage systems, and located in an enterprise data center. In this embodiment, consolidating the servers 106 in this way can improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 can be interconnected using a wide-area network (WAN) connection or a metropolitan-area network (MAN) connection. For example, a machine farm 38 can include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 can include one or more servers 106 operating according to a type of operating system, while one or more other servers 106 execute one or more types of hypervisors rather than operating systems. In these embodiments, hypervisors can be used to emulate virtual hardware, partition physical hardware, virtualize physical hardware, and execute virtual machines that provide access to computing environments, allowing multiple operating systems to run concurrently on a host computer. Native hypervisors can run directly on the host computer. Hypervisors can include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors can run within an operating system on a second software level. Examples of hosted hypervisors can include VMware Workstation and VIRTUALBOX.

Management of the machine farm 38 can be de-centralized. For example, one or more servers 106 can comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 can communicate with a persistent store and, in some embodiments, with a dynamic store.

Server 106 can be a file server, application server, web server, proxy server, appliance, network appliance, gateway, gateway server, virtualization server, deployment server, SSL VPN server, or firewall. In one embodiment, the server 106 can be referred to as a remote machine or a node. In another embodiment, a plurality of nodes 290 can be in the path between any two communicating servers.

Figure 1B:
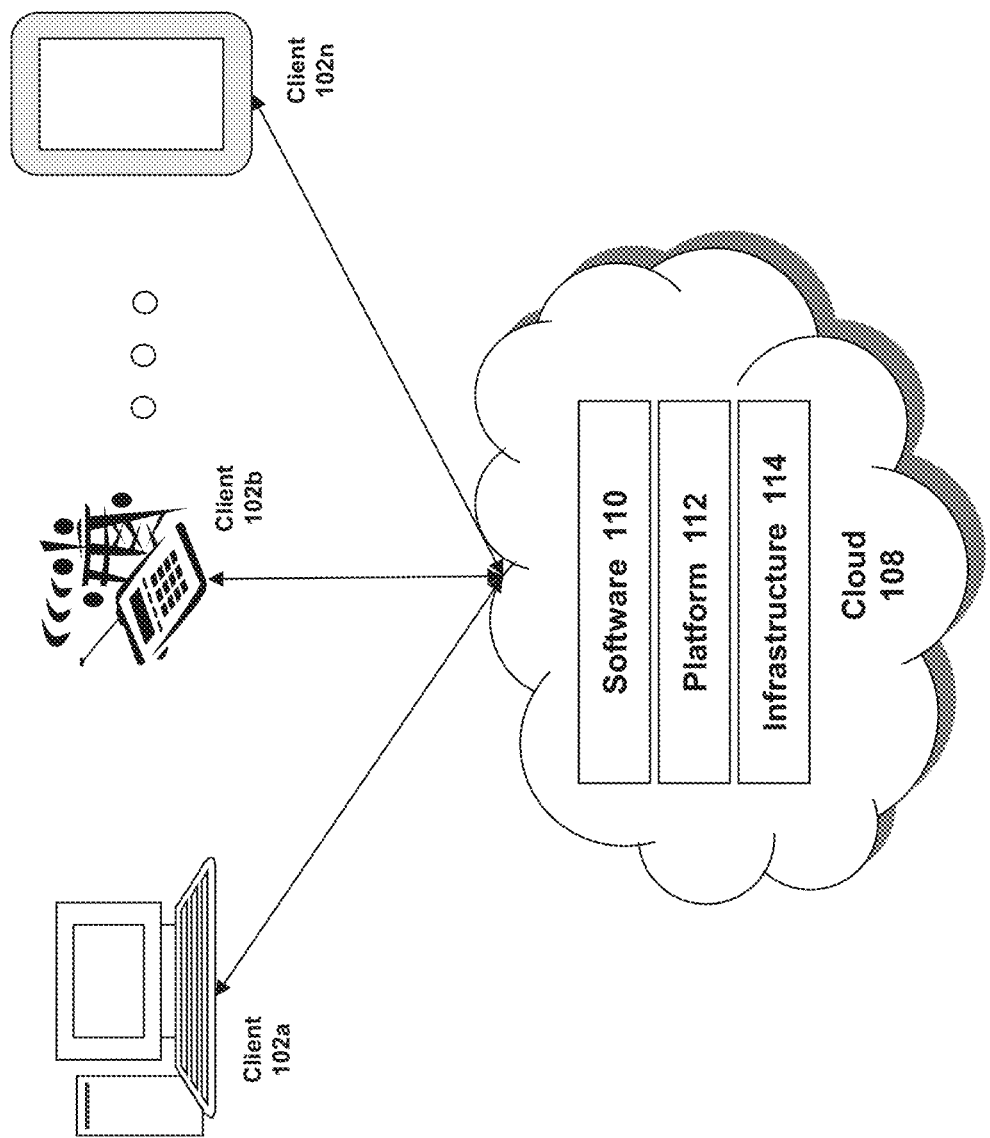
FIG. 1B is a block diagram depicting a cloud computing environment comprising a client device in communication with cloud service providers.

Referring to FIG. 1B, a cloud computing environment is depicted. A cloud computing environment can provide client 102 with one or more resources provided by a network environment. The cloud computing environment can include one or more clients 102a-102n, in communication with the cloud 108 over one or more networks 104. Clients 102 can include, e.g., thick clients, thin clients, and zero clients. A thick client can provide at least some functionality even when disconnected from the cloud 108 or servers 106. A thin client or a zero client can depend on the connection to the cloud 108 or server 106 to provide functionality. A zero client can depend on the cloud 108 or other networks 104 or servers 106 to retrieve operating system data for the client device. The cloud 108 can include back end platforms, e.g., servers 106, storage, server farms or data centers.

The cloud 108 can be public, private, or hybrid. Public clouds can include public servers 106 that are maintained by third parties to the clients 102 or the owners of the clients. The servers 106 can be located off-site in remote geographical locations as disclosed above or otherwise. Public clouds can be connected to the servers 106 over a public network. Private clouds can include private servers 106 that are physically maintained by clients 102 or owners of clients. Private clouds can be connected to the servers 106 over a private network 104. Hybrid clouds 108 can include both the private and public networks 104 and servers 106.

The cloud 108 can also include a cloud based delivery, e.g. Software as a Service (SaaS) 110, Platform as a Service (PaaS) 112, and Infrastructure as a Service (IaaS) 114. IaaS can refer to a user renting the use of infrastructure resources that are needed during a specified time period. IaaS providers can offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers can offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers can offer the resources that PaaS provides, including storage, networking, servers, virtualization, operating system, middleware, or runtime resources. In some embodiments, SaaS providers can offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS can also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 can access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards can allow clients access to resources over HTTP, and can use Representational State Transfer (REST) protocol or Simple Object Access Protocol (SOAP). Clients 102 can access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that can be built on REST, HTTP, XML, or other protocols. Clients 102 can access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 can also access SaaS resources through smartphone or tablet applications, including, e.g., Salesforce Sales Cloud, or Google Drive app. Clients 102 can also access SaaS resources through the client operating system, including, e.g., Windows file system for DROPBOX.

In some embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

Figure 1C:
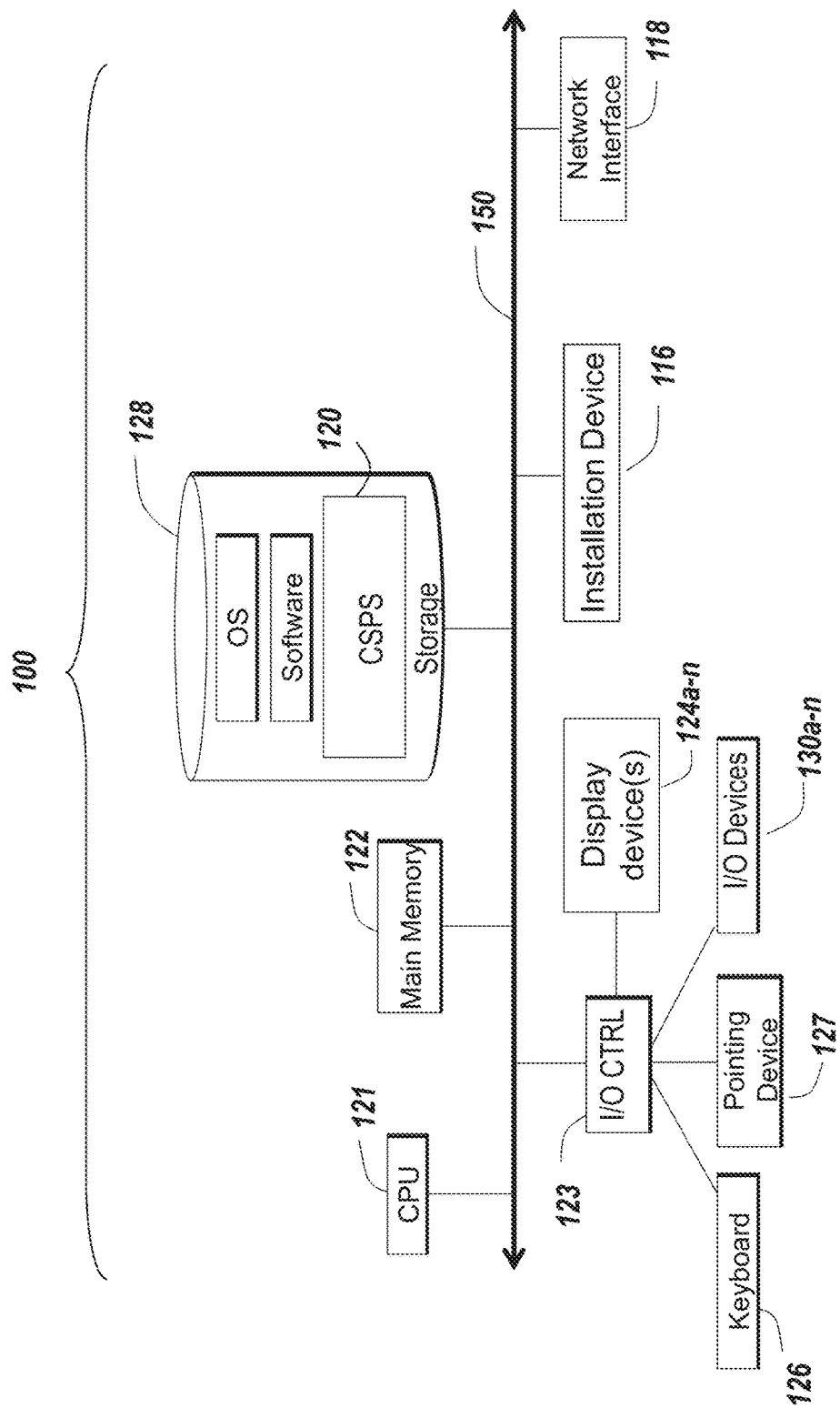
FIGS. 1C and 1D are block diagrams depicting embodiments of computing devices useful in connection with the methods and systems described herein.
Figure 1D:
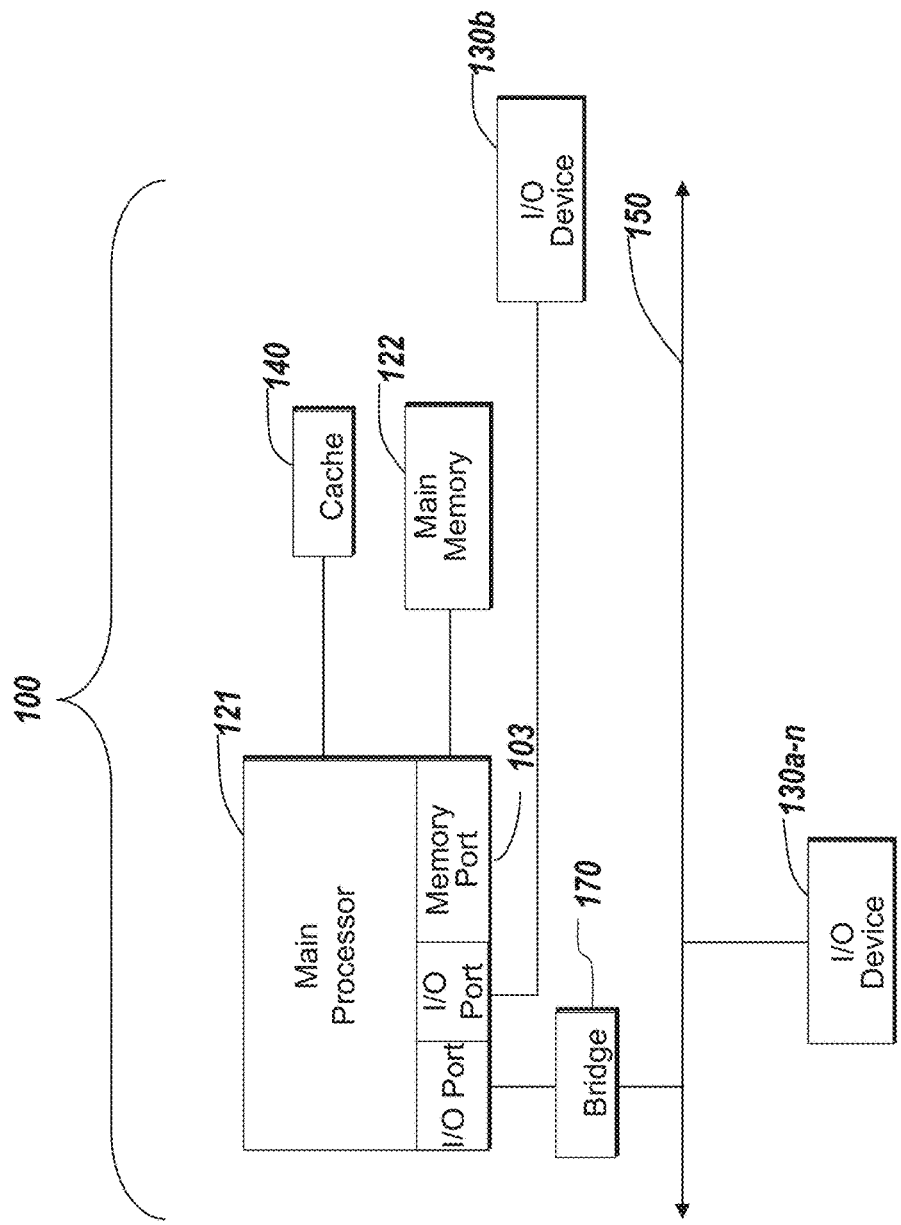

The client 102 and server 106 can be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 can include a storage device 128, an installation device 116, a network interface 118, an I/O controller 123, display devices 124a-124n, a keyboard 126 and a pointing device 127, e.g. a mouse. The storage device 128 can include, without limitation, an operating system, software, and a software of a centralized state processing system (CSPS) 120. As shown in FIG. 1D, each computing device 100 can also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 can be based on any of these processors, or any other processor capable of operating as described herein. The central processing unit 121 can utilize instruction level parallelism, thread level parallelism, different levels of cache, and multi-core processors. A multi-core processor can include two or more processing units on a single computing component. Examples of multi-core processors include the AMD PHENOM IIX2, INTEL CORE i5 and INTEL CORE i7.

Main memory unit 122 can include one or more memory chips capable of storing data and allowing any storage location to be directly accessed by the microprocessor 121. Main memory unit 122 can be volatile and faster than storage 128 memory. Main memory units 122 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 can be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 can be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 can be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses can be used to connect the central processing unit 121 to any of the I/O devices 130, including a PCI bus, a PCI-X bus, or a PCI-Express bus, or a NuBus. For embodiments in which the I/O device is a video display 124, the processor 121 can use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 130a-130n can include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which can be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 130a-130n, display devices 124a-124n or group of devices can be augment reality devices. The I/O devices can be controlled by an I/O controller 123 as shown in FIG. 1C. The I/O controller can control one or more I/O devices, such as, e.g., a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices. In further embodiments, an I/O device 130 can be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n can be connected to I/O controller 123. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays can use, e.g. stereoscopy, polarization filters, active shutters, or autostereoscopy. Display devices 124a-124n can also be a head-mounted display (HMD). In some embodiments, display devices 124a-124n or the corresponding I/O controllers 123 can be controlled through or have hardware support for OPENGL or DIRECTX API or other graphics libraries.

In some embodiments, the computing device 100 can include or connect to multiple display devices 124a-124n, which each can be of the same or different type and/or form. As such, any of the I/O devices 130a-130n and/or the I/O controller 123 can include any type and/or form of suitable hardware, software, or combination of hardware and software to support, enable or provide for the connection and use of multiple display devices 124a-124n by the computing device 100. For example, the computing device 100 can include any type and/or form of video adapter, video card, driver, and/or library to interface, communicate, connect or otherwise use the display devices 124a-124n. In one embodiment, a video adapter can include multiple connectors to interface to multiple display devices 124a-124n. In other embodiments, the computing device 100 can include multiple video adapters, with each video adapter connected to one or more of the display devices 124a-124n. In some embodiments, any portion of the operating system of the computing device 100 can be configured for using multiple displays 124a-124n. In other embodiments, one or more of the display devices 124a-124n can be provided by one or more other computing devices 100a or 100b connected to the computing device 100, via the network 104. In some embodiments software can be designed and constructed to use another computer's display device as a second display device 124a for the computing device 100. For example, in one embodiment, an Apple iPad can connect to a computing device 100 and use the display of the device 100 as an additional display screen that can be used as an extended desktop. One ordinarily skilled in the art will recognize and appreciate the various ways and embodiments that a computing device 100 can be configured to have multiple display devices 124a-124n.

Referring again to FIG. 1C, the computing device 100 can comprise a storage device 128 (e.g. one or more hard disk drives or redundant arrays of independent disks) for storing an operating system or other related software, and for storing application software programs such as any program related to the software 120 for the centralized state processing system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 128 can be non-volatile, mutable, or read-only. Some storage device 128 can be internal and connect to the computing device 100 via a bus 150. Some storage device 128 can be external and connect to the computing device 100 via a I/O device 130 that provides an external bus. Some storage device 128 can connect to the computing device 100 via the network interface 118 over a network 104, including, e.g., the Remote Disk for MACBOOK AIR by Apple. Some client devices 100 may not require a non-volatile storage device 128 and can be thin clients or zero clients 102. Some storage device 128 can also be used as an installation device 116, and can be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform can facilitate installation of software on a client device 102. An application distribution platform can include a repository of applications on a server 106 or a cloud 108, which the clients 102a-102n can access over a network 104. An application distribution platform can include application developed and provided by various developers. A user of a client device 102 can select, purchase and/or download an application via the application distribution platform.

Furthermore, the computing device 100 can include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 can comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, can be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 can have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 can comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players can have other functionality, including, e.g., a gaming system or any functionality made available by an application from a digital application distribution platform. For example, the IPOD Touch can access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Fraud Detection and Control in Centralized Processing

Systems and methods of the present solution are directed to fraud detection and controlled in centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure. However, it may be challenging to reliably and efficiently detect and control fraudulent activity or transactions when the devices used to conduct or initiate the transactions are grouped in different tiers because the fraudulent activity may go undetected or unnoticed as it can be masked within a tier. Thus, systems and methods of the present technical solution are directed to detecting and control fraud in centralized state processing.

For example, the present solution can provide a centralized state processing system configured with a clusterer, model generator, fraud detector, and packet blocker. This system can detect fraud based on comparing debit card spending activity with historical spending activity at various segmentation levels (e.g., third-party administrator levels, employer levels). For example, the total spend for an employer having 1000 individual employees may be more stable. This technology is directed to protecting the employer, as opposed to just the individual employee. The technology can stop all transactions for an employer responsive to detecting fraud. Further, the technology can disable all fraudulent cards, as well as non-fraudulent cards, associated with the same group level. Thus, by establishing models and monitoring on various segmentation levels, as opposed to just the individual transaction, the system can detect and control fraud at any segmentation level (e.g., based on group activity), thereby intercepting fraud on the group level that may otherwise go undetected at the individual transaction level.

For example, Employer A may be associated with 1000 participant computing devices, w which can correspond to 1000 employees. The Employer A may be affiliated with a Third-Party Administrator Device A ("TPA A"). One or more of the participant computing devices may initiate a transaction at one or more point-of-sale terminals ("POS terminal"). The transaction, however, may be approved on an individual basis because the transaction might occur at a POS terminal that was previously used by the one or more participant computing devices to conduct a transaction, as well as for a transaction amount that may have been within modeled transaction amount. Thus, using models generated for individual participant computing devices, the system may not detect fraudulent behavior on any of the 1000 participant computing devices.

However, the system can also generate a model for a segmentation level or cluster. A cluster can refer to a group of participant devices that are linked or associated with one another. The cluster can refer to a group of participant devices that are grouped based on a similar characteristic (e.g., geography or type of plan). The cluster can refer to a group of participant devices that are grouped based on being associated with a same employer (e.g., Employer A). The cluster can refer to a group of employers linked or associated with the same TPA. Thus, the system can generate one or more clusters based on one or more segmentation levels.

The system can generate a model for the one or more clusters. The system can generate the model based on historical activity for the cluster. For example, the system can look at total spend per week for a segmentation level (e.g., Employer A). The system can then normalize for certain factors (e.g., big enrollment). The system can then analyze current transaction activity and compare it with the model to detect fraud. The system can detect the fraud based on multiple transactions in the cluster that may have occurred within a time period. The system can detect that fraud occurred in the cluster, and then identify the fraudulent transactions associated with the individual participant devices in the cluster. For example, if all participant devices are spending only $25 more per week, the system may not normally flag these individual transactions are fraudulent. However, if all participant devices associated with Employer A are spending $25 more per week, then the system may detect this as fraud on the Employer A segmentation level.

Responsive to detecting fraud on the segmentation level, the system can block, lock, disable or otherwise prevent further fraudulent transactions from occurring with the participant devices associated with the fraudulent transaction. However, to further protect the cluster level (e.g., Employer A or TPA A), the system can block, lock, disable or otherwise prevent further fraudulent transactions from occurring from any participant device associated with the cluster level, regardless of whether or not the participant devices was associated with a fraudulent transaction.

Thus, by generating models on the cluster level and detecting fraud based on the cluster, the present technical solution can more efficiently detect fraud that might otherwise go undetected, thereby providing a technical improvement to a centralized state processing system. For example, a system analyzing fraud using a model generated for an individual participant device may take longer to detect fraud, as compared to a system using models generated for a cluster because the fraudulent or abnormal pattern may be more efficiently detected on a cluster-level as opposed to an individual level. Further, the present technical solution, by more efficiently detecting fraud that might otherwise go undetected, can reduce resource consumption by blocking or prevent fraudulent network activity or the transmission of fraudulent network data packets, thereby reducing network bandwidth usage. Further, by disabling both fraudulent and non-fraudulent devices on a cluster level, the system can reduce the resource utilization that may have otherwise been consumed to correct or reverse the fraud by preventing fraudulent transactions from ever occurring on certain devices.

Figure 2:
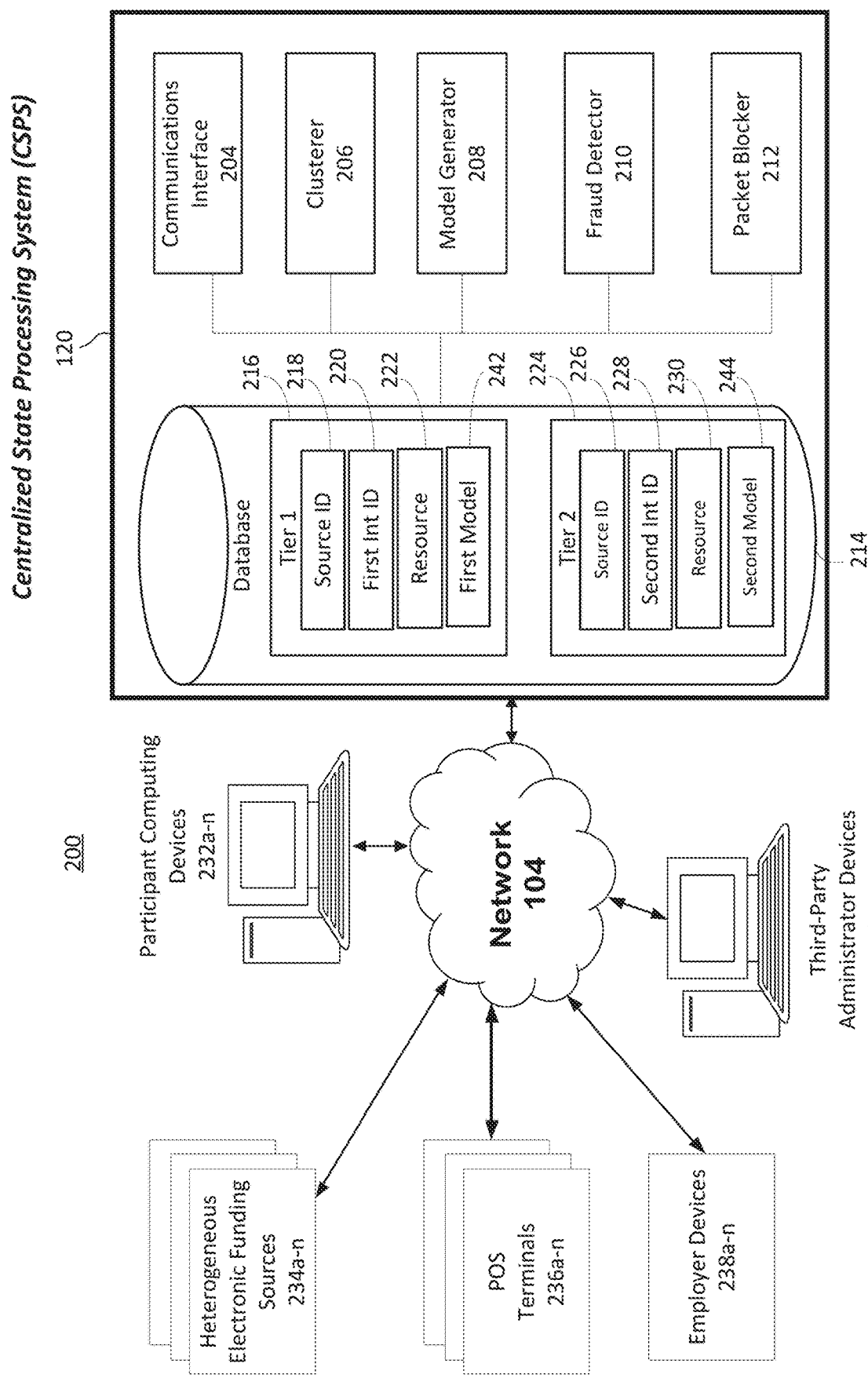
FIG. 2 is a block diagram depicting an embodiment of a system for fraud detection and control.

Referring now to FIG. 2, a block diagram depicting an embodiment of a system 200 comprising a centralized state processing system is shown. In brief overview, the system 200 includes a centralized state processing system 120 ("CSPS") that can receive and/or transmit data via a network 104 with participant computing devices 232a-n, third-party administrator devices 240a-n, employer devices 238a-n, point-of-sale terminals 236a-n, or heterogeneous electronic funding sources 234a-n. The CSPS 120 can include a communications interface 204 that is configured with one or more communications ports, application programming interfaces, network protocols (e.g., TCP/IP), authentication protocols, or security protocols (e.g., SSL). The CSPS 120 can include, interface with, or otherwise access a clusterer 206 that generates or identifies a cluster or segmentation level in which to group electronic transactions. The CSPS 120 can include, interface with, or otherwise access a model generator 208 that generates one or more models using historical transaction information for the clusters generated or identified by the clusterer 206. The CSPS 120 can include, interface with, or otherwise access a fraud detector 210 that detects fraudulent transaction activity associated with a cluster. The CSPS 120 can include, interface with, or otherwise access a packet blocker 212 that locks or disables accounts associated with the cluster in which fraud is detected in order to prevent further packets carrying electronic transactions from either being sent or processed. The CSPS 120 can include one or more databases or data structure that store information to facilitate the systems and methods of the present solution, such as database 214. The database 214 can include data structures, files or otherwise categorize information into different clusters or tiers. For example, the clusterer 206 can cluster or group transactions or accounts into two tiers: tier 1 (216) and tier 2 (224). The data structure corresponding to tier 1 (216) can include a first source identifier data structure 218, first intermediary device identifier 220, a first resource 222, and a first model 242. The data structure corresponding to tier 2 (224) can include a second source identifier data structure 226, second intermediary device identifier 228, a second resource 230, and a second model 244. The database 214 can also include one or more policies, profiles, merchant information, or historical transaction activity.

The system 120, communications interface 204, clusterer 206, model generator 208, fraud detector 210, and packet blocker 212 can each include one or more processing units or other logic devices such as programmable logic array engines, modules, or circuitry designed and constructed to facilitate managing security on a network infrastructure. The CSPS 120 can include the components 100 shown in FIG. 1C or FIG. 1D, or be configured to operate as a service in cloud 108. The CSPS 120 can include or interact with one or more servers 106a-n and clients 102a-n. The participant computing devices 232a-n, POS terminals 236a-n, employer devices 238a-n, TPA devices 240a-n, or heterogeneous electronic funding sources 234a-n can each include one or more component or functionality of client computing devices 102a-n or server 106a-n.

In some embodiments, the CSPS 120 can employ a multitier architecture such as a client-server architecture in which presentation, application processing, and data management functions are logically or physically separated. The presentation tier, or front-end, can include the communications interface 204 that can serve static content or dynamic content to be rendered by the client 102 (e.g., by a web browser executing on client 102). The presentation tier or web server can interact or communicate with the application tier to obtain data to provide to the client 102, computing devices, 232a-n, TPA devices 240a-n, employer devices 238a-n, funding sources 234a-n, or POS terminals 120a-n. The application tier can include the clusterer 206, model generator 208, fraud detector 210, and packet blocker 212 that controls the system's functionality and performs additional processing or analysis on data. The application tier can interact with the data tier to obtain the transaction data. The data tier can include data persistence mechanisms (database servers, file shares, etc.) and the data access layer that encapsulates the persistence mechanisms and exposes the data. The data tier can include databases 214. The data tier can include an application programming interface (API) to the application tier. The databases 214 can include stored procedures (e.g., SQL statements) that perform tasks with respect the stored data.

The system 200 can include, access, or otherwise communicate with one or more third-part administrator ("TPA") devices 240a-n. A TPA can refer to an organization that processes insurance claims or certain aspects of employee benefit plans for a separate entity. A TPA can refer to organizations within the insurance industry which "administer" other services such as Underwriting or Customer Service. In some cases, a TPA can handle the claims processing for employers 238a-n that self-insures its employees 232a-n. Thus, the employers 238a-n are acting as an insurance company and underwrites the risk. The risk of loss can remains with the employer 238a-n, and not with the TPA 240a-n. An insurance company may also use a TPA 240a-n to manage its claims processing, provider networks, utilization review, or membership functions. The TPA 240a-n can handle many aspects of other employee benefit plans such as the processing of retirement plans and flexible spending accounts. Many employee benefit plans have highly technical aspects and difficult administration that can make using a specialized entity such as a TPA 240a-n more cost effective than doing the same processing in house.

In the health care industry, for example, TPAs 240a-n can administer all or a portion of the claims process. TPAs 240a-n can be contracted by a health insurer or self-insuring companies to administer services, including claims administration, premium collection, enrollment and other administrative activities. For example, an employer 238a-n may choose to help finance the health care costs of its employees 232a-n by contracting with a TPA 240a-n to administer many aspects of a self-funded health care plan.

Administrators, such as companies or health insurance providers, can establish electronic benefits accounts such as flexible spending accounts or healthcare tax benefit accounts (e.g., health savings accounts) for participants such as employees, subscribers, or customers. These electronic benefits accounts can provide a tax advantage for the participants. Administrators that establish or provide electronic tax benefits accounts for various participants of those accounts can utilize backend information technology infrastructure to process, analyze, monitor or manage the electronic tax benefits accounts. The tax benefit management information technology infrastructure can be configured with processing rules that are applied to electronic transactions. Electronic transactions can include allocating funds to the tax benefit account, withdrawing funds from the tax benefit account, making a purchase with funds from the tax benefit account, modifying a profile of the tax benefit account, or submitting a claim. The management information technology infrastructure can apply one or more rules to each type of transaction to determine an event. As the types of transactions and rules increase in number and complexity, the types and events can also increase in number and complexity, thereby consuming an increasing amount of resources of the information technology infrastructure. For example, events such as a card denial increases the number of transaction attempts, communications with the server, account resets, profile corruption, or resources consumed by a point-of-sale device initiating the transaction.

The employer devices 238a-n can refer to a device used by an entity or organization that is associated with the participant computing devices 232a-n of the employees of the employer. For example, Employer A can be a software company that has a thousand employees associated with the participant computing devices 232a-n. The employees can obtain health care or other services, and pay for those services at a POS terminal 236a-n of the service provider.

Data packets can be generated by a device 240a-n at an administrator. The device can refer to an administrator device ("administrator device") such as administrator device 240a-n. The administrator device 240a-n may monitor data from the various electronic benefits accounts associated with the administrator. The accounts associated with the administrator may be accounts that are managed or maintained by the administrator. The administrator may be a point of contact for customers or participants of the associated accounts. In some embodiments, the client 102, which may correspond to an individual participant of the administrator's electronic benefits account, may access the account and perform a number of actions with respect to the account, such as, fund the account (e.g., via heterogeneous electronic funding sources 234a-n), withdraw from the account, charge the account, and the like. The administrator of the electronic benefits account, as the caretaker of the account, may adjust parameters associated with the account, such as, monthly fees, minimum running balances, etc. At the same time, the CSPS 120 may monitor the data, parameters, and performance of the account and store the information under an administrator profile associated with the administrator of the account. The CSPS 120 may receive the data associated with the individual participants and their individual accounts from the client's 102 and the parameter data associated with the accounts from the administrator device 240a-n via the network 104.

An administrator device 240a-n can be the place where an administrator may perform various functions of the administrator, for example, functions associated with electronic benefits accounts of the administrator. The administrator device 240a-n is the point at an administrator that may send requests or transaction information to the CSPS 120 for further processing or data collection. The administrator device 240a-n may also be configured to transmit an identifier associated with the administrator corresponding to the administrator device 240a-n for identification by the CSPS 120. In some embodiments, the receiving of the identifier initiates a fraud detection and control process.

The administrator device 240a-n can include hardware and software. Administrators can utilize scanners, EFTPOS terminals, touch screens and any other wide variety of hardware and software available for use with administrator device 240a-n. For example, an administrator can use software to make adjustments to parameters associated with their electronic benefits accounts.

The administrator device 240a-n can include advanced features to cater to different functionality, such as account participant forecasts and estimates, account simulation, communication with participants of accounts, performing actions associated with individual participant accounts (e.g., freezing an account), collecting data from one or more of the participant accounts, etc., all built into the administrator software. The administrator device 240a-n can be configured to execute user-input commands with respect to the electronic benefits accounts of the administrator.

In some embodiments, the communication interface 204 can receive data packets. The data packets can carry one or more electronic transactions. In some cases, the data packets can carry multiple electronic transactions. In some cases, the data packets can be received over a duration of time. The electronic transactions can occur over the duration of time. In some cases, the electronic transaction information carried via the data packets can be received by the CSPS 120 in real-time, such as responsive to the occurrence of the electronic transaction. In some cases, the CSPS 120 can receive the information about the electronic transactions in a bulk upload or batch upload. Receiving the information about the electronic transaction sin a bulk upload or batch upload can reduce computing resource utilization or network bandwidth usage, thereby improving the efficiency of the CSPS 120. For example, the provider of the information about the electronic transactions can compress the information and generate data packets carrying the compressed information in a single batch or bulk transmission, thereby reducing network bandwidth utilization.

The electronic transaction information carried via the data packets can include information that facilitates performance of the electronic transaction, or analyzing the electronic transaction to detect fraudulent activity. The electronic transaction can include a source identifier pointing to a data structure storing a resource, a destination identifier corresponding to a data structure to transfer the resource, and an intermediary identifier corresponding to an entity that provides at least a portion of the resource stored in the data structure. The source identifier can refer to an account identifier that contains the resource being transferred from a source to a destination. The source identifier can refer to an account of an employee of an employer. The source identifier can correspond to an account associated with a participant computing device 232. The resource can correspond to an electronic resource or physical resource being represented in an electronic form. The resource can refer to or include a token, currency, points, or other resource that can be transferred from the source to a destination. The destination identifier an correspond to an entity or organization receiving the resource. The destination identifier can correspond to a provider of a service or good that is receiving the resource in return for performing the service or providing the good to the employee. The intermediary identifier can correspond to an entity that stores, holds, manages, provides, or maintains the resource. The intermediary identifier can refer to or correspond to the employer device 238a-n, a heterogeneous electronic funding source 234a-n or TPA 240a-n.

An identifier corresponding to a data structure can refer to or include an identifier pointing to a data structure, such as a memory pointer. The identifier corresponding to a data structure can refer to or include an identifier used by a lookup to retrieve, identify, access or select the data structure. The identifier can label the data structure. The identifier can be mapped to the data structure.

The data packets or electronic transaction can be generated by a device at a merchant to conduct an electronic transaction at the merchant. The device can refer to a point of sale terminal ("POS terminal") such as POS terminal 236a-n. In some embodiments, the POS terminals 236a-n are the devices at which retail transactions are initiated. The POS terminals 236a-n are the points at which a customer of the entity or merchant makes a payment to the merchant in exchange for goods or services. At the point of sale the merchant can calculate the amount owed by the customer and provide options for the customer to make payment. The merchant can also issue a receipt for the transaction.

The POS terminal 236a-n can include hardware and software. Merchants can utilize weighing scales, scanners, electronic and manual cash registers, EFTPOS terminals, touch screens and any other wide variety of hardware and software available for use with POS terminal 236a-n. For example, a pharmacy can use software to customize the item or service sold when a customer has a special medication request.

The POS terminal 236a-n can include advanced features to cater to different functionality, such as inventory management, CRM, financials, warehousing, flexible spending account transactions, etc., all built into the POS software. The POS terminal 236a-n can be configured to conduct a transactions using a debit card, multipurse card, Bluetooth, near field communications, smartphone, smartwatch, mobile telecommunications computing device, wearable communications, RFID, etc.

The CSPS 120 can include a communications interface 204. The communications interface 204 can execute on one or more processors of a server. The communications interface 204 can include one or more communications ports and be configured with one or more network protocols. Communications ports can include, e.g., network ports, Ethernet ports, WAN ports, I/O ports, or software ports. The communication port can be configured with a network protocol such as Transport Layer Protocols such as TCP/IP or UDP that are configured to receive and process data packets received via a computer network. The port can include or be associated with an IP address of a host and a protocol type of the communication.

The communications interface 204 can receive data packets generated by the POS terminal 236a-n responsive to an electronic transaction resulting in transmission of a request to adjudicate a single claim against an electronic benefits account. In some embodiments, the request to adjudicate a single claim against the electronic benefits account is transmitted responsive to a user swiping a payment card at the POS terminal. The payment card can include identifying information that can be used to identify an account identifier of the electronic benefit account (e.g., source identifier) against which to adjudicate the claim. The data packets can include header information and payload information. Multiple data packets can be strung together in a sequence. The header information can refer to TCP/IP headers that include fields such as source port, destination port, sequence number, acknowledge number, window size, etc. The payload information of the data packet can include information related to the electronic transaction, the request to adjudicate a single claim, the merchant, or the customer. The CSPS 120 can receive the data packet with header information and payload information and process the packets to obtain information for further processing. The payload can include data identifying the POS terminal 236a-n (e.g., POS terminal 236a) at which the electronic transaction occurred, the merchant providing the POS terminal 236a, a merchant category of the merchant, financial information associated with the user performing the electronic transaction (e.g., via a card swipe or other communication technique used to perform the electronic transaction), an amount of expenditures of the electronic transaction, and other information facilitating adjudication of the single claim. The data packets (e.g., via the payload) can include the request to adjudicate the single claim. The request can specify the electronic benefits account for adjudication. The request can specify information for identifying a policy for performing the adjudication. The payload can include data identifying a merchant category of the merchant, an electronic benefits account, and a monetary amount of the electronic transaction.

The data packets can carry data identifying a merchant or merchant category of the merchant. In some embodiments, the data carried by the data packets include a merchant category code or identifier (e.g., dental, medical, etc.). In some embodiments, the data identifies a merchant, and the CSPS 120 determines a merchant category based on the identification of the merchant by, for example, using a merchant to merchant category mapping or lookup table stored in database. In some embodiments, the data packets carrying the request to adjudicate the single claim against the electronic benefits account include a data structure having a first field indicating a merchant identifier, a second field indicating a total amount of expenditures, and a third field indicating the electronics benefit account. In some embodiments, the data packets are generated by a merchant device (e.g., a client device 102 of a merchant) to conduct an electronic transaction at the merchant, and the data packets carry data identifying a merchant category of the merchant, the electronic benefits account maintained and configured on the CSPS 120, and a total monetary amount of the electronic transaction.

The data packets (e.g., payload of the data packets) can further identify an electronic account maintained and configured on the server. The electronic account can be maintained and configured in a database 214. The electronic account can correspond to a user and have a unique identifier. The unique identifier can include numbers, letters, characters, symbols, etc. The electronic account can be associated with the customer making the transaction at the merchant. The POS terminal 236a can receive or determine the electronic account identifier via a card swipe or other communication technique employed at the POS terminal 236a, which the POS 236a can then convey to the CSPS 120.

The communications interface 120 can further receive data packets (e.g., payload information) identifying a monetary amount of the electronic transaction, such as a total amount of expenditures. The monetary amount can be for the purchase of goods or services made at the merchant. The monetary amount of the transaction can refer to the amount of funds in consideration for goods or services obtained from the entity or merchant. The merchant or entity can refer to the entity at which a point-of-sale terminal or device used to make the transaction is located or with which the terminal is associated. The monetary amount can be in any currency (e.g., United States dollars) or units. The monetary amount can be further tied to a category, such as medical services.

In some embodiments, the POS terminal 236a can generate multiple data packets for a single transaction. The multiple data packets can each include a header and a payload. The header can indicate that the multiple data packets are to be grouped together for routing, transmission or processing purposes.

The CSPS 120 can be configured to authenticate communications and transactions. In some embodiments, the communications interface 204 receives communications such as the request to adjudicate the single claim. The request can include security credential such as a security certificate or security token. The security credential can be associated with a user or a merchant. The CSPS 120 can be configured to extract the security credential from the request, and authenticate the request by comparing the security credential against a known or verified security credential. For example, the user profiles and/or merchant information stored in database 214 can include known or verified security credentials for comparison with the security credential of the request. In some embodiments, the CSPS 120 receives the request to adjudicate the single claim via the communications interface 204, extracts a security credential from the request, analyzes the extracted security credential to identify a user, queries the database 214 for a verified security credential stored with a user profile corresponding to the identified user, compares the extracted security credential to the verified security credential, and authenticates the request based on the extracted security credential matching the verified security credential. In some embodiments, the CSPS 120 analyzes the extracted security credential to identify a merchant, queries the database 214 for a verified security credential stored with merchant information corresponding to the identified merchant, compares the extracted security credential to the verified security credential, and authenticates the request based on the extracted security credential matching the verified security credential.

In some embodiments, the communications interface 210 can receive data packets. The data packets can be generated by a first device at a first merchant to conduct a first electronic transaction at the first merchant. The first device can refer to a POS terminal such as POS terminal 120a. A point of sale terminal 120 ("POS") is the place where a retail transaction is completed. The POS terminal 120 is the point at which a customer of the entity or merchant makes a payment to the merchant in exchange for goods or services. At the point of sale the merchant can calculate the amount owed by the customer and provide options for the customer to make payment. The merchant can also issue a receipt for the transaction.

The POS terminal 120 can include hardware and software. Merchants can utilize weighing scales, scanners, electronic and manual cash registers, EFTPOS terminals, touch screens and any other wide variety of hardware and software available for use with POS terminal 120. For example, a pharmacy can use software to customize the item or service sold when a customer has a special medication request.

The POS terminal 120 can include advanced features to cater to different functionality, such as inventory management, CRM, financials, warehousing, flexible spending account transactions, etc., all built into the POS software. The point of sale terminal 120 can be configured to conduct a transactions using a debit card, multipurse card, Bluetooth, near field communications, smartphone, smartwatch, mobile telecommunications computing device, wearable communications, RFID, etc.

The communications interface 210 can receive data packets generated by the POS Terminal 120a responsive to conducting an electronic transaction. The data packets can include header information and payload information. Multiple data packets can be strung together in a sequence. The header information can refer to TCP/IP headers that include fields such as source port, destination port, sequence number, acknowledgment number, window size, etc. The payload information of the data packet can include information related to the transaction, merchant, or customer. The system 120 can receive the data packet with header information and payload information and process the packets to obtain information for further processing. The payload can include data identifying a first merchant category of the first merchant, an electronic account, and a monetary amount of the electronic transaction.

The data packets can carry data identifying a merchant or merchant category of the merchant. In some embodiments, the data carried by the data packets include a merchant category code or identifier (e.g., dental, medical, etc.). In some embodiments, the data identifies a merchant, and the system 120 determines a merchant category based on the identification of the merchant by, for example, using a merchant to merchant category mapping or lookup table stored in database 214.

The data packets (e.g., payload of the data packets) can further identify an electronic account maintained and configured on the server. The electronic account can be maintained and configured in a database 214. The electronic account can correspond to a user and have a unique identifier. The unique identifier can include numbers, letters, characters, symbols, etc. The electronic account can be associated with the customer making the transaction at the merchant. The POS terminal 236a can receive or determine the electronic account identifier via a card swipe or other communication technique employed at the POS terminal 236a, which the POS 236a can then convey to the system 120.

The communications interface 204 can further receive data packets (e.g., payload information) identifying a first monetary amount of the first electronic transaction. The monetary amount can be for the purchase of goods or services made at the merchant. The monetary amount of the transaction can refer to the amount of funds in consideration for goods or services obtained from the entity or merchant. The merchant or entity can refer to the entity at which a point-of-sale terminal or device used to make the transaction is located or with which the terminal is associated. The monetary amount can be in any currency (e.g., United States dollars) or units. The monetary amount can be further tied to a category, such as medical services.

In some embodiments, the POS terminal 236a can generate multiple data packets for a single transaction. The multiple data packets can each include a header and a payload. The header can indicate that the multiple data packets are to be grouped together for routing, transmission or processing purposes.

The CSPS 120 can include a clusterer 204 designed, constructed and operational to cluster or group the electronic transactions identified in the data packets received by the communications interface 204. The clusterer 204 can cluster, group, categorize, or otherwise aggregate or organize the electronic transactions or aspects thereof. The CSPS 120 can cluster the source identifier of each of the plurality of electronic transactions based on the intermediary identifier of each of the plurality of electronic transactions to identify a first cluster of source identifiers in a first tier having a first intermediary identifier, and a second cluster of source identifiers in a second tier having a second intermediary identifier.

Each of the electronic transactions can include a source identifier and an intermediary identifier. The electronic transactions can also include a destination identifier. The CSPS 120 can group or cluster the electronic transactions based on one or more of the source identifier, intermediary identifier, or destination identifier. The intermediary identifier can correspond to an entity that configures or authorized the source identifier, such as an employer device 238 or TPA device 240.

The CSPS 120 can select the clustering scheme based on a segmentation policy. The CSPS 120 can use the segmentation policy to select a segmentation level, which can define the type of identifier to use to generate the clusters. For example, the segmentation level can be employer level, TPA level, geographic region, participant device level, funding account type level, or merchant category level. The segmentation policy can indicate a predetermine segmentation level to use. The segmentation policy can indicate the segmentation level to use based on a number of transactions the CSPS 120 received in the data packets for a duration. For example, the CSPS 120 received a large number of electronic transaction information, the CSPS 120 may determine to use a segmentation level to cluster the electronic transactions such that fewer clusters are generated, thereby reducing the amount of downstream processing performed by the CSPS 120, thereby reducing resource consumption, and processor utilization, memory utilization. The CSPS 120 can compare the number of electronic transactions with a threshold to determine which segmentation level to use to generate the clusters. For example, if the number of electronic transactions received for a predetermined time interval is greater than a threshold, the CSPS 120 can determine to generate clusters using a segmentation level corresponding to the employer. If, on the other hand, the CSPS 120 determines that the number of electronic transactions is less than the threshold, the CSPS 120 can determine to use a segmentation level that corresponds to a merchant category. In some cases, the segmentation policy can be configured to increase the sensitivity with which the CSPS 120 detects fraud. For example, the segmentation policy can optimize for fraud detection.

For example, the segmentation policy can indicate to generate clusters based on the employer segmentation level. The CSPS 120 can then identify electronic transactions in the received data packets that correspond to the same employer. The CSPS 120 can identify the electronic transactions corresponding to the same employer based on an identifier in the electronic transaction. The identifier can be the intermediary identifier, which can map to the identifier of the employer. The CSPS 120 can then group all transactions with the same intermediary identifier into a first cluster of first tier. Similarly, the CSPS 120 can generate a cluster electronic transactions for each corresponding intermediary identifier. For example, the CSPS 120 can generate a second cluster comprising electronic transactions having a second intermediary identifier.

The CSPS 120 can store the clusters in the database 214. The CSPS 120 can store the clusters in tier data structures. The CSPS 120 can generate a first tier data structure 216 that includes electronic transactions having a same first intermediary identifier 220. The electronic transactions grouped in the first tier (or tier 1 data structure) 216 can have different source identifiers 218. The electronic transactions grouped in the first tier data structure 216 can have different resources identifiers 222. The electronic transactions grouped in the first tier data structure 216 can have different destination identifiers. The CSPS 120 can generate a second cluster and store the second cluster in database 214 as tier 2 data structure. The tier 2 data structure can include electronic transactions having the same second intermediary identifier 228, but different source identifiers 226 or resource identifiers 230 or destination identifiers.

The CSPS 120 can include a model generator 208 designed, constructed or operational to generate a first model for the first cluster of source identifiers and a second model for the second cluster of source identifiers. The CSPS 120 can store the first model in a first model data structure 242, and store the second model in a second model data structure 244, in database 214. The models (e.g., first model 242 or second model 244) can be based on historical electronic transaction information. The CSPS 120 can generate the models using the electronic transaction information received via the data packets. The CSPS 120 can generate the model using electronic transactions that occurred over a time interval, such as 7 days, 30 days, 60 days or 90 days or some other time interval. The CSPS 120 can generate the model using electronic transactions that are known to not contain fraudulent transactions. For example, the CSPS 120 can generate the model using electronic transactions that are honest or legitimate. The CSPS 120 can generate the model as a baseline model indicative of the electronic transactions that are expected to occur over the time interval for the cluster.

For example, the first model for the first tier can indicate an average transaction amount for the time interval, the average frequency of transactions, the average number of transactions per day, the average transactions per hour, the average number of transactions per minute, total amount of transactions, or total amount for the time interval. The model can indicate the average transactions per merchant category, geographic area, employer, or TPA. The model can indicate the average rate of transaction per merchant category, geographic area, employer or TPA. The model can indicate the average transaction amount per merchant category, geographic area, employer or TPA. Instead of average, the model can indicate some other statistical metric, such as median, mode, standard deviation, variance, etc.

For example, the first model can indicate that the average number of transactions per day for the tier 1 cluster is 10; the average transaction amount is $50; and the total amount of transactions for 30 days is $15,000. The first model can further indicate that the average number of transactions per day at a merchant category corresponding to a pharmacy is 7, and the average number of transactions per day at a merchant category corresponding to a healthcare provider is 3. In another example, the second model can indicate that the average number of transactions per day for the tier 2 cluster is 50, with a standard deviation of 10 transactions per day, such that approximately 68% of days over the time interval each have between 40 to 60 transaction occurrences. The second model can further indicate that the average amount for a transaction is $100, and that 50% of the transactions occur at a healthcare service provider merchant category, 10% of transactions occur at a dental provider, 10% occur at a vision provider, and the remaining 30% occur at a pharmacy.

The model generator 208 can generate one or more models per cluster, using one or more statistical metrics, parameters, values, or categories.

The model generator 208 can use a machine learning model to generate models for clusters of electronic transactions. The model generator 208 can use a machine learning model to determine the segmentation levels to use to generate the models. For example, the model generator can generate multiple different models formed from different clusters that may include the same source identifier. For example, the first source identifier can be included in a first cluster at the intermediary device segmentation level. The first source identifier can also be included in a second cluster that is formed from a geographic area segmentation level (e.g., Massachusetts).

The model generator 208 can generate, based on a machine learning model, the first model based on first historical electronic transactions associated the first tier that occurred during a first predetermined time interval absent the fraudulent electronic transaction. For example, the transactions that occurred during the first predetermined time interval may be known to be not fraudulent; e.g., honest or legitimate transactions. The model generator 208 can generate, based on the machine learning model, the second model based on second historical electronic transactions associated with the second tier that occurred during a second predetermined time interval absent the fraudulent electronic transaction, the second predetermined time interval absent the fraudulent electronic transaction and different from the first predetermined time interval.

To generate the models, the model generator 208 can select a time interval. The model generator 208 can select the time interval from a predetermined list of time intervals, such as 48 hours, 72 hours, 7 days, 30 days, 60 days, 90 days. The model generator 208 can select the time interval based on a number of desired transactions that are expected to occur in the time interval. The model generator 208 can use a dynamic time interval. The model generator 208 can use a rolling time interval in which the model is updated as new data is received by the CSPS 120. The model generator 208 can use different time intervals for different segmentation levels. For example, for a segmentation level associated with a large number of transactions (e.g., greater than 1000 transactions per day), the model generator 208 can use a smaller time interval and still generate a satisfactory model. For a segmentation level associated with fewer transactions (e.g., less than 100 transactions per day), the model generator 208 can use a larger time interval. In some cases, the model generator 208 can select a time interval based on a statistical metric of the data. For example, if the variance is high, then the model generator 208 can determine to use a larger time interval in an effort to get more stable data with which to build the model.

The time intervals selected for generation of the model may not include transactions having fraudulent electronic transactions. The model generator 208 can select the first predetermined time interval absent the fraudulent electronic transaction to generate the first model based on a first characteristic of the first tier. Characteristics of the tier can include, for example, the number of transactions that occur in a time interval, variance, amount of the transactions, segmentation level, merchant category, or other characteristic. The model generator 208 can select a second, different predetermined time interval to generate the second model based on a second characteristic of the second tier.

The model generator 208 can use a machine learning algorithm or neural network to select time intervals that provide satisfactory models that can be used to reliably detect fraud in subsequent electronic transactions.

The model generator 208 can generate models at different levels of granularity or segmentation levels. For example, the model generator 208 can generate an individual model for a source identifier, which can be referred to as an electronic transaction model for the first source identifier. This electronic transaction model can be for a source identifier, which can correspond to a user or account. The electronic transaction model can be based on historical electronic transactions associated with the source identifier. The CSPS 120 can use the electronic transaction model to detect a fraudulent electronic transaction having the source identifier. The electronic transaction may also have the same intermediary identifier, in which case the CSPS 120 can identify a cluster corresponding to the intermediary identifier, and lock all source identifiers associated with the cluster.

The CSPS 120 can include a fraud detector 210 designed, constructed or operational to detect a fraudulent electronic transaction. The fraud detector 210 can detect the fraudulent electronic transaction using a model, such as the first model. The fraud detector 210 can detect a fraudulent electronic transaction having a first source identifier and the first intermediary identifier, the first source identifier pointing to a first data structure storing a first resource (e.g., tier 1 data structure storing first resource 222). The fraud detector 210 can detect the fraud based on a comparison between the electronic transaction and the first model.

The fraud detector 210 can detect the fraud based on a comparison between multiple electronic transactions during a time interval and the first model. For example, the fraud detector 210 can detect the fraud based on analyzing multiple electronic transactions during a time interval, such as 7 days. The fraud detector 210, via the clusterer 206, can generate a from the multiple electronic transactions, where the cluster is formed form electronic transactions having the same first intermediary identifier. The fraud detector 210 can receive an indication of this cluster, and then select, from database 214, a model generated from historical, honest electronic transaction activity for a cluster with the same intermediary identifier. The fraud detector 210, using the select model, can determine a statistical metric, such as the average number of transactions per day which can be 10, for example. The fraud detector 210 can determine the statistical metric for the current set of electronic transactions having the same intermediary identifier to be 25 average electronic transactions over the course of 7 days. Responsive to the comparison, the fraud detector 210 can determine that the average number of transaction exceeds the modeled average number of transaction, and then determine that fraud has occurred. In some embodiments, responsive to the comparison, the fraud detector 210 can determine that the average number of transaction exceeds the modeled average number of transaction by a threshold amount (e.g., 25%, 30%, 40%, 50%, 100%, 150%, 1 standard deviation, 2 standard deviations, 10 transactions, 15 transactions, etc.), and then determine that fraud has occurred. The threshold can be an absolute value, such as a number of transactions, a percentage, a ratio, or a statistical metric such as standard deviation.

Thus, the fraud detector 210 can detect fraud by comparing current or recently received electronic transactions with a model generated from historical electronic transactions that have been clustered based on a segmentation level selected using a segmentation policy. In some cases, the fraud detector 210 generates a cluster for the recently received electronic transactions using the segmentation level, and then selects a model for a cluster generated from the same segmentation level. The fraud detector 210 can compare the statistical metric for the recently created cluster with the model to detect fraud.

In some cases, the fraud detector 210 can detect fraud in an individual electronic transaction. For example, a metric of the individual transaction can vary from the model such that the fraud detector 210 determines it to be a fraudulent transaction. For example, the model can include an average transaction amount. The statistics around the average transaction amount can include a standard deviation. The fraud detector 210, using the model, can determine that 99.7% of transactions amounts are within 3 standard deviations of the average. If the fraud detector 210 detects one or more electronic transactions having transaction amounts that vary more than 3 standard deviations from the average transaction amount, the fraud detector 210 can determine fraud has occurred. The fraud detector 210 can perform this fraud detection process on a segmentation level, such as if more than a threshold number of electronic transactions in a day have transaction amounts that exceed the $3^{rd}$ standard deviation, then the fraud detector can determine fraud has occurred.

For example, the mean transaction amount for a second model corresponding to a second intermediary identifier (e.g., Employer B) can be $50. The standard deviation can be $10. The fraud detector 210 can detect a first electronic transaction at the same segmentation level as the second model that has a transaction amount that exceeds 3 standard deviations (e.g., $30) from the modeled mean of $50. For example, the first electronic transaction can be $15. The fraud detector 210 may determine that since 0.3% of the transactions in the model exceed 3 standard deviations, that the first electronic transaction may not be fraud. Therefore, the fraud detector 210 may not detect fraud for the first electronic transaction. However, the fraud detector 210 may then detect a second electronic transaction on the same day that has an amount of $90 that also exceeds the mean by 3 standard deviation. The fraud detector 210 can detect fraud on the second electronic transaction because that may represent more than the allotted 0.3% that could fall outside of the 3 standard deviations. In some cases, the fraud detector 210 may not detect fraud until a threshold number of electronic transactions at the predetermined segmentation level occur within a time interval that exceeds a threshold number of standard deviations for the model corresponding to the segmentation level.

Upon detecting fraud, the fraud detector 210 can generate an alert based on a type of fraud detected by the centralized state processing system. The type of fraud can refer to the type of model used to detect the fraud, or the characteristic or statistical metric of the model that was used to detect the fraud. For example, the type of model can refer to the segmentation level (e.g., individual electronic transaction model, employer segmentation model, TPA segmentation model, geographic area segmentation model, etc.). The statistic metric of the model used to detect the fraud can include, for example, average transaction amount, average number of transactions per day, standard deviation, etc. The fraud detector 210 can transmit the alert to a device, such as a device associated with the first intermediary identifier (e.g., employer device 238 or TPA device 24).

Upon detecting a fraudulent transaction having a source identifier and intermediary identifier, the fraud detector 210 can provide an indication that a fraudulent electronic transaction has been initiated, in the process of being performed, or already occurred. The CSPS 212 can include a packet blocker 212 designed, constructed and operational to lock, responsive to detection of the fraudulent electronic transaction, a data structure to prevent transfer of the resource in electronic transactions associated with the source identifier.

The packet blocker 212 can prevent the electronic transaction from occurring responsive to the fraud detector 210 determining that the electronic transaction is fraudulent. The packet blocker 212 can prevent the electronic transaction from occurring by preventing the completion of the transaction by not transferring the resources from the account requested by the transaction. The packet blocker 212 can disable the account corresponding to the source identifier. The packet blocker 212 can lock the data structure corresponding to the first source identifier 218 to prevent any funds from being withdrawn from the account, or to prevent the data structure from being manipulated.

Upon determining, by the fraud detector 210, that there may be fraudulent transactions occurring at a segmentation level corresponding to an intermediary identifier (e.g., Employer A or TPA A or other segmentation level), the packet blocker 212 can identify multiple source identifiers associated with segmentation level in order to disable or lock the accounts to prevent further fraudulent transactions from occurring. For example, if the fraud detector 210 identifies a fraudulent transaction having a first intermediary identifier and using the first model corresponding to a first cluster in the first tier formed from electronic transactions having the first intermediary identifier, the packet blocker 212 can then identify all source identifiers associated with the first intermediary identifier of the first cluster. The packet blocker 212 can determine that since fraud has occurred at the first cluster or first tier level (e.g., Employer A), then to prevent further fraud from occurring the accounts that have not yet been associated with a fraudulent transaction but are associated with the same first cluster or first tier should also be disabled. Thus, the packet blocker 212 can lock, even absent detection of the fraudulent electronic transaction in one or more electronic transaction associated with the remaining source identifiers, the data structure corresponding to each of the remaining source identifiers in the first cluster of source identifiers.

Locking the source identifier can include flagging the account as inactive, temporarily disabled, locked, blocked, or on hold. In some cases, the packet blocker 212 can automatically unlock the account after a predetermined time interval. In some cases, unlocking the account can require a multifactor authentication. In some cases, the CSPS 120 can change an identifier prior to unlocking the account, such as the intermediary identifier or source identifier.

The packet blocker 212 can block packets carrying electronic transactions associated with one or more of the plurality of source identifiers associated with the tier or cluster in which the fraud detector 210 has detected a fraudulent transaction. In some embodiments, locking the source identifiers can include preventing completion of electronic transactions associated with one or more of the source identifiers. When an electronic transaction is blocked or prevented, or a source identifier is locked, the CSPS 120 can send a reply message that indicates the transaction is blocked or prevented.

After or subsequent to the one or more source identifiers associated with the segmentation level being locked, the CSPS 120 can request or require authentication credentials to perform an electronic transaction. For example, the CSPS 120 can request a multi-factor authentication. The CSPS 120 can request multi-factor authentication responsive to a request to conduct an electronic transaction associated with a source identifiers that is locked. For example, locking a source identifier can include or refer to requesting authentication to perform the electronic transaction or requesting a different type of authentication to perform the electronic transaction (e.g., passcode, username, password, voice authentication, acoustic fingerprint, biometric passcode, multi-device based authentication, text message based authentication, etc.).

In some cases, the CSPS 120 may not detect fraud on an individual transaction, but detect fraud when analyzing a cluster of electronic transaction and using a model generated from previously received or historical electronic transactions. For example, the individual transaction model based on the individual source identifier may be consistent with the current electronic transaction for the source identifier. However, when analyzing electronic transactions in the aggregate for the time interval, the CSPS 120 may detect fraud. For example, the CSPS 120 can receive a second plurality of electronic transactions associated with the first tier (e.g., same intermediary identifier corresponding to an employer or TPA). The CSPS 120 can authorize each of the second plurality of electronic transactions based on not detecting fraud on each of the second plurality of electronic transactions when using corresponding individual transaction models. The CSPS 120 can then apply a statistical analysis to an aggregate of the second plurality of electronic transactions, and detect fraud in the first tier based on the statistical analysis applied to the aggregate of the second plurality of transactions. Thus, the present solution can detect fraud on a segmentation level when fraud may not be detected on an individual transaction when analyzed independently. The CSPS 120 can then lock source identifiers associated with the second plurality of electronic transactions.

Figure 3:
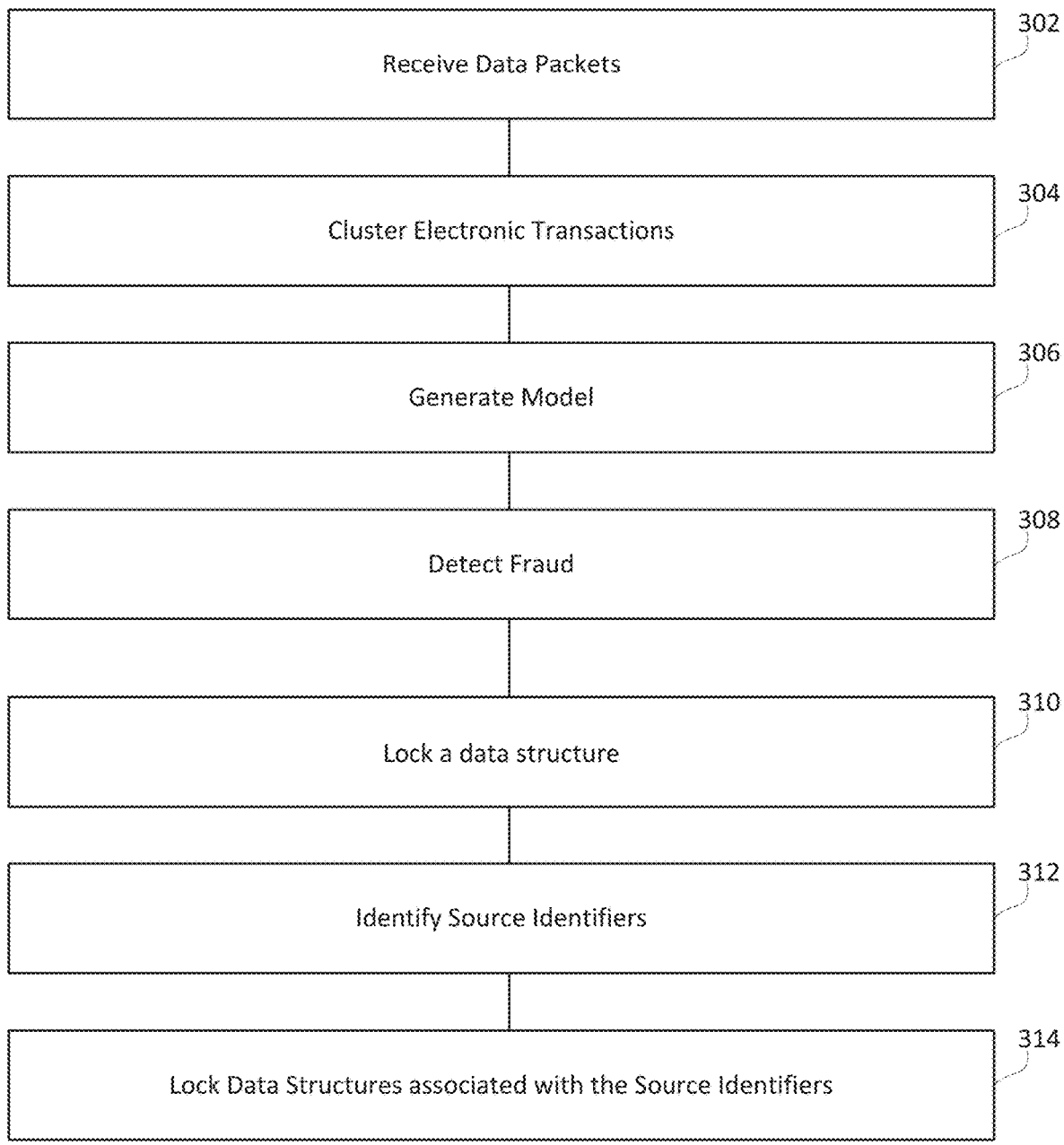
FIG. 3 is a flow diagram depicting an embodiment of a method of fraud detection and control.

Referring now to FIG. 3, a method of detecting and controlling fraud in a centralized state processing system in accordance with an embodiment is provided. The method 300 can be performed using one or more system or component depicted in FIGS. 1A-1D or FIG. 2, including, for example, a centralized state processing system, communications interface, clusterer, model generator, fraud detector and packet blocker. In brief overview, the method 300 can include a centralized state processing system ("CSPS") receiving data packets at step 302. The CSPS can cluster electronic transactions at step 304. The CSPS can generate a model at step 306. The CSPS can detect fraud at step 308. The CSPS can lock a data structure at step 310. The CSPS can identify additional source identifiers at step 312. At step 314, the CSPS can lock the data structures associated with the additional identified source identifiers.

Still referring to FIG. 3, and in further detail, the method 300 can include the CSPS receiving data packets at step 302. The data packets can carry multiple electronic transactions. The CSPS can receive the data packets via a network. The CSPS can retrieve the data packets from a database. The CSPS can receive the data packets in real-time, or a bulk upload or batch process. For example, the CSPS can receive the data packets during a batch process that occurs on a periodic basis, such as every 24 hours, 12 hours, 36 hours or some other time interval. The CSPS can receive the data packets responsive to a trigger condition or event, such as a request from an administrator of the CSPS, alarm condition, notification, etc.

The data packets can include a header and a payload. The payload can carry information associated with the electronic transaction. The payload can include information that facilitate the performance of the electronic transaction. The payload can include information such as a source identifier, destination identifier, and an intermediary identifier. The source identifier can correspond to an account or data structure storing a resource that is to be transferred to an entity corresponding to the destination identifier. The intermediary identifier can correspond to an entity that established the source identifier or account thereof, or otherwise facilitates the performance of the electronic transaction. For example, the source identifier can correspond to an account for a participant of a health care savings plan. The destination identifier can correspond to a merchant or health care service provider. The intermediary identifier can correspond to an employer or TPA that established the account for the participant. For example, the intermediary identifier can correspond to an employer or TPA that provides, maintains, or manages at least a portion of the resource stored in the data structure corresponding to the source identifier.

The CSPS can cluster electronic transactions at step 304. The CSPS can group the electronic transactions based on a characteristic that is common to the electronic transactions. The characteristic can include an identifier associated with the electronic transaction, an entity associated with the electronic transactions, an amount of the electronic transactions, a time of day of the electronic transaction, a merchant category associated with the electronic transaction, a geographic region or area associated with the electronic transaction, or a device type associated with or used to perform the electronic transaction. For example, the CSPS can cluster the source identifier of each of the electronic transactions based on the intermediary identifier of each of the electronic transactions. Upon clustering, the CSPS can identify a first cluster of source identifiers in a first tier having a first intermediary identifier, and a second cluster of source identifiers in a second tier having a second intermediary identifier. The first tier can refer to a segmentation level or specific entity. For example, the first tier can refer to Employer A and the second tier can refer to Employer B. In some cases, the different tier can correspond to different segmentation levels. For example, the first tier can correspond to employer devices or employers, and the second tier can correspond to TPAs.

Within a tier, the CSPS can identify one or more clusters. For example, within tier 1, the CSPS can generate one or more clusters based on a characteristic associated with the source identifiers of the first tier. For example, the CSPS can generate a first cluster within tier 1 that is associated with a first geographic region, and the CSPS can generate a second cluster also within tier 1 that is associated with a second geographic region.

The CSPS can generate a model at step 306. The CSPS can generate a model for each cluster. The CSPS can perform a quality check before generating the model for a cluster. For example, the CSPS can determine whether there are a sufficient number of electronic transactions in the cluster prior to generating a model. The CSPS can determine whether the transactions are valid before using them to generate the model. For example, the CSPS can determine that a transaction is valid if it has not been denied, rejected, or flagged as fraudulent. The CSPS can determine that a transaction is valid if it has not been disputed for a predetermined time period, such as 30 days, 60 days, or a bill pay cycle. Thus, the CSPS can generate the model using valid electronic transactions based on a pre-processing technique or quality check.

The CSPS can generate a first model for the first cluster of source identifiers and a second model for the second cluster of source identifiers. The CSPS can generate models for different characteristics. The CSPS can generate a model that includes statistical metrics associated with the cluster of electronic transactions.

The CSPS can detect fraud at step 308. The CSPS can use a model to detect the fraud. The CSPS can detect that an individual transaction is fraudulent, or that that a group of transactions in the aggregate reflect fraudulent activity or behavior. The CSPS can detect or identify source identifiers associated with the fraud.

The CSPS can lock a data structure at step 310. The CSPS can lock, responsive to detection of the fraudulent electronic transaction, the account or data structure. Locking the account can refer to blocking or preventing the transaction from occurring or being completed. Preventing the transaction from being completed can refer to or include preventing resources from being transferred from the source to a destination (e.g., preventing the transfer of funds in an electronic account). In some cases, the CSPS can lock a data structure to prevent transfer of the resource stored in the data structure.

The CSPS can identify additional source identifiers at step 312. The CSPS can identify source identifiers associated with the first cluster of source identifiers in the first tier associated with the detected fraud. The CSPS can identify some or all of the source identifiers in the same cluster or tier in which a fraudulent transaction was detected. At step 314, the CSPS can lock the data structures associated with the additional identified source identifiers. The CSPS can lock the additional source identifiers even though fraud may not have been detected on a transactions associated with the additionally identified source identifier. This may prevent a fraudulent transaction from occurring. By preemptively blocking or locking the additional source identifiers, the CSPS can more efficiently control fraud because the fraud analysis procedure (e.g., comparing a transaction with a model) can be skipped for the additional source identifiers while still effectively preventing fraud. Thus, the CSPS can save resources, computing utilization, processor utilization, and network bandwidth by controlling fraud on a segmentation level.

Further, the CSPS can detect fraud using an aggregate of electronic transaction to detect fraud on a segmentation level, which might otherwise go undetected on an individual transaction level. Thus, the CSPS can improve the ability of a system to detect fraud on an aggregate level.

It should be understood that the systems described above can provide multiple ones of any or each of those components and these components can be provided on either a standalone machine or, in some embodiments, on multiple machines in a distributed system. The systems and methods described above can be implemented as a method, apparatus or article of manufacture using programming or engineering techniques to produce software, firmware, hardware, or any combination thereof. In addition, the systems and methods described above can be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture can be accessible from a file server providing access to the computer-readable programs via a network transmission line, wireless transmission media, signals propagating through space, radio waves, infrared signals, etc. The article of manufacture can be a flash memory card or a magnetic tape. The article of manufacture includes hardware logic as well as software or programmable code embedded in a computer readable medium that is executed by a processor. In general, the computer-readable programs can be implemented in any programming language, such as LISP, PERL, C, C++, C #, PROLOG, or in any byte code language such as JAVA. The software programs can be stored on or in one or more articles of manufacture as object code.

References to "or" may be construed as inclusive so that any terms described using "or" may indicate any of a single, more than one, and all of the described terms.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method, comprising:
receiving, by a data processing system comprising one or more processors and memory, data packets carrying a plurality of electronic transactions, each of the plurality of electronic transactions comprising a source identifier corresponding to a data structure storing a resource, a destination identifier corresponding to a data structure to transfer the resource, and an intermediary identifier corresponding to an entity that provides at least a portion of the resource stored in the data structure;
clustering, by the data processing system, the source identifier of each of the plurality of electronic transactions based on the intermediary identifier of each of the plurality of electronic transactions to identify a first cluster of source identifiers in a first tier of a plurality of tiers having a first intermediary identifier;
identifying, by the data processing system, a first model for the first cluster of source identifiers trained using machine learning on first historical electronic transactions associated with the first tier that occurred during a first predetermined time interval absent fraudulent electronic transactions;
detecting, by the data processing system using the first model, a fraudulent electronic transaction having a first source identifier and the first intermediary identifier, the first source identifier corresponding to a first data structure storing a first resource;
identifying, by the data processing system, a plurality of source identifiers associated with the first cluster of source identifiers in the first tier; and
locking, by the data processing system responsive to detection of the fraudulent electronic transaction using the first model generated via machine learning with the first historical electronic transactions, absent detection of the fraudulent electronic transaction in one or more electronic transaction associated with the plurality of source identifiers, the data structure corresponding to each of the plurality of source identifiers in the first cluster of source identifiers.

2. The method of claim 1, comprising:
generating the first model based on first historical using machine learning; and
generating a second model for a second cluster of source identifiers in a second tier of the plurality of tiers having a second intermediary identifier, the second model generating using machine learning on second historical electronic transactions associated with the second tier that occurred during a second predetermined time interval absent the fraudulent electronic transaction, the second predetermined time interval absent the fraudulent electronic transaction and different from the first predetermined time interval.

3. The method of claim 2, comprising:
selecting the first predetermined time interval absent the fraudulent electronic transaction to generate the first model based on a first characteristic of the first tier; and
selecting the second predetermined time interval to generate the second model based on a second characteristic of the second tier.

4. The method of claim 1, comprising:
generating an electronic transaction model for the first source identifier;
using the electronic transaction model to detect the fraudulent electronic transaction having the first source identifier and the first intermediary identifier; and
locking, responsive to detection of the fraudulent electronic transaction, the first data structure to prevent transfer of the first resource in electronic transactions associated with the first source identifier.

5. The method of claim 1, comprising:
receiving a second plurality of electronic transactions associated with the first tier;
authorizing each of the second plurality of electronic transactions based on not detecting fraud on each of the second plurality of electronic transactions;
applying a statistical analysis to an aggregate of the second plurality of electronic transactions;
detecting fraud in the first tier based on the statistical analysis applied to the aggregate of the second plurality of transactions, wherein fraud is not detected on each of the second plurality of electronic transactions when analyzed independently; and
locking, by the centralized state processing system, source identifiers associated with the second plurality of electronic transactions.

6. The method of claim 1, comprising:
generating an alert based on a type of fraud detected by the centralized state processing system; and
transmitting the alert to a device associated with the first intermediary identifier.

7. The method of claim 1, wherein the intermediary identifier of each of the plurality of electronic transactions corresponds to an entity that configures or authorized the source identifier associated with each of the plurality of electronic transactions.

8. The method of claim 1, wherein locking the plurality of source identifiers associated with the first tier that are not detected to be fraudulent comprises:
blocking packets carrying electronic transactions associated with one or more of the plurality of source identifiers.

9. The method of claim 1, wherein locking the plurality of source identifiers associated with the first tier that are not detected to be fraudulent comprises:
preventing completion of electronic transactions associated with one or more of the plurality of source identifiers.

10. The method of claim 1, comprising:
subsequent to locking the plurality of source identifiers associated with the first tier, requesting multi-factor authentication responsive to a request to conduct an electronic transaction associated with one or more of the plurality of source identifiers that are locked.

11. A system, comprising:
a data processing system comprising one or more processors and memory that execute a fraud detector to:
receive data packets carrying a plurality of electronic transactions, each of the plurality of electronic transactions comprising a source identifier corresponding to a data structure storing a resource, a destination identifier corresponding to a data structure to transfer the resource, and an intermediary identifier corresponding to an entity that provides at least a portion of the resource stored in the data structure;
cluster the source identifier of each of the plurality of electronic transactions based on the intermediary identifier of each of the plurality of electronic transactions to identify a first cluster of source identifiers in a first tier of a plurality of tiers having a first intermediary identifier;
identify a first model for the first cluster of source identifiers trained using machine learning on first historical electronic transactions associated with the first tier that occurred during a first predetermined time interval absent fraudulent electronic transactions;
detect, using the first model, a fraudulent electronic transaction having a first source identifier and the first intermediary identifier, the first source identifier corresponding to a first data structure storing a first resource;
identify a plurality of source identifiers associated with the first cluster of source identifiers in the first tier; and
lock, responsive to detection of the fraudulent electronic transaction using the first model generated via machine learning with the first historical electronic transactions, and absent detection of the fraudulent electronic transaction in one or more electronic transaction associated with the plurality of source identifiers, the data structure corresponding to each of the plurality of source identifiers in the first cluster of source identifiers.

12. The system of claim 11, wherein the centralized data state processing system is further configured to:
generate the first model using machine learning; and
generate a second model for a second cluster of source identifiers in a second tier of the plurality of tiers having a second intermediary identifier, the second model generating using machine learning on second historical electronic transactions associated the second tier that occurred during a second predetermined time interval absent the fraudulent electronic transaction, the second predetermined time interval absent the fraudulent electronic transaction and different from the first predetermined time interval.

13. The system of claim 12, wherein the data state processing system is further configured to:
select the first predetermined time interval absent the fraudulent electronic transaction to generate the first model based on a first characteristic of the first tier; and
select the second predetermined time interval to generate the second model based on a second characteristic of the second tier.

14. The system of claim 11, wherein the data state processing system is further configured to:
generate an electronic transaction model for the first source identifier;
use the electronic transaction model to detect the fraudulent electronic transaction having the first source identifier and the first intermediary identifier; and locking, responsive to detection of the fraudulent electronic transaction, the first data structure to prevent transfer of the first resource in electronic transactions associated with the first source identifier.

15. The system of claim 11, wherein the data state processing system is further configured to:
  receive a second plurality of electronic transactions associated with the first tier;
  authorize each of the second plurality of electronic transactions based on not detecting fraud on each of the second plurality of electronic transactions;
  apply a statistical analysis to an aggregate of the second plurality of electronic transactions;
  detect fraud in the first tier based on the statistical analysis applied to the aggregate of the second plurality of transactions, wherein fraud is not detected on each of the second plurality of electronic transactions when analyzed independently; and
  lock source identifiers associated with the second plurality of electronic transactions.

16. The system of claim 11, wherein the data state processing system is further configured to:
  generate an alert based on a type of fraud detected by the centralized state processing system; and
  transmit the alert to a device associated with the first intermediary identifier.

17. The system of claim 11, wherein the intermediary identifier of each of the plurality of electronic transactions corresponds to an entity that configures or authorized the source identifier associated with each of the plurality of electronic transactions.

18. The system of claim 11, wherein the data state processing system is further configured to:
  block packets carrying electronic transactions associated with one or more of the plurality of source identifiers.

19. The system of claim 11, wherein the data state processing system is further configured to:
  preventing completion of electronic transactions associated with one or more of the plurality of source identifiers.

20. The system of claim 11, wherein the data state processing system is further configured to:
  subsequent to the plurality of source identifiers associated with the first tier locked, request multi-factor authentication responsive to a request to conduct an electronic transaction associated with one or more of the plurality of source identifiers that are locked.

* * * * *